United States Patent [19]

Popa

[11] Patent Number: 4,678,629

[45] Date of Patent: Jul. 7, 1987

[54] NUCLEAR FUEL PELLET CONTAINING GADOLINIA

[75] Inventor: Frank D. Popa, Monroeville Boro, Pa.

[73] Assignee: Westinghouse Electric Corp., Pittsburgh, Pa.

[21] Appl. No.: 772,826

[22] Filed: Sep. 5, 1985

[51] Int. Cl.$^4$ .................................................. G21C 3/00
[52] U.S. Cl. ..................................... 376/419; 376/412; 376/428; 376/455
[58] Field of Search ................ 376/419, 428, 455, 412

[56] References Cited

U.S. PATENT DOCUMENTS 3,137,636  6/1964  Wilkner ................................. 376/419
3,427,222  2/1969  Biancheria ........................... 376/419

FOREIGN PATENT DOCUMENTS 51-35885  of 1976  Japan .
54-150582  11/1979  Japan .
59-187289  10/1984  Japan .

*Primary Examiner*—Donald P. Walsh
*Attorney, Agent, or Firm*—D. M. Satina

[57] ABSTRACT

The present invention relates to a nuclear fuel pellet having two sections: a cylindrical inner pellet inside of an annular outer pellet. The inner pellet is composed of gadolinia and natural or depleted uranium as $UO_2$. The outer pellet contains enriched uranium as $UO_2$ but without gadolinia.

10 Claims, 2 Drawing Figures

NUCLEAR FUEL PELLET CONTAINING GADOLINIA

BACKGROUND OF THE INVENTION

The present invention relates to the area of nuclear fuel materials mixed with a burnable poison for use in thermal reactors such as pressurized water (PWR) and boiling water (BWR) reactors. It is especially concerned with the mixtures of uranium oxide and gadolinium oxide.

In the past gadolinia ($Gd_2O_3$) has been used extensively in BWR cores as a burnable absorber to control power distribution and reactivity. More recently it has also been used in PWR reactors. In the past gadolinia powder has been mixed with urania powder, then pressed and sintered into almost fully dense, solid cylindrical pellets. These poisoned pellets are then loaded in specific locations of a number of the fuel rods to provide the desired control over power distribution and reactivity.

Gadolinia has a number of drawbacks, especially as a burnable absorber for PWRs. It degrades the thermal properties of the fuel pellet by lowering the melting temperature and by lowering the thermal conductivity of the fuel pellet. In addition, gadolinium consists of a number of isotopes. The odd isotopes, gadolinium 155 and 157, have high thermal neutron absorption cross-sections and provide the desired control over power distribution and reactivity. These high cross-section isotopes however make up only about 30% of the gadolinium present (the remainder being low cross-section even isotopes) and burn out relatively quickly, transmuting upon absorption of a neutron to gadolinum 156 and 158, which, while having significantly lower cross-sections, parasitically absorb neutrons throughout the fuel cycle. The rapid burnout of gadolinium 155 and 157 produces an undersirable peaking in the power of the fuel rods containing the poisoned pellets, while the parasitic absorption of neutrons by the even isotopes produces an undesirable increase in the fuel cycle cost.

One of the ways the art has attempted to address some of the above problems, has been to propose a fuel pellet design consisting of an outer annular layer of only $UO_2$ or $UO_2+PuO_2$ and an inner plug of a mixture of $UO_2$ and $Gd_2O_3$. These and other similar designs are exemplified by Japanese Pat. No. 51-35885, Japanese Pat. No. Sho 54-150582 and Pat. No. Sho 59-187289. In these designs since the gadolinia content of the overall pellet has been concentrated in the center of the pellet a self shielding effect is produced which consequently slows the burnout of the absorber.

I now submit that rather surprisingly significant improvements can be obtained over the prior art pellet design by the improved poisoned fuel pellet design in accordance with the present invention.

SUMMARY OF THE INVENTION

In accordance with the present invention a nuclear fuel pellet is provided having an annular outer layer or pellet containing an inner pellet located concentrically within it. The annular outer layer contains enriched $UO_2$ without a burnable absorber. The cylindrical inner pellet contains about 4 to about 18 weight percent (w/o) gadolinia with $UO_2$ forming the remainder. The $UO_2$ in the cylindrical inner pellet contains uranium consisting of either natural uranium, depleted uranium or a mixture of natural and depleted uranium. The cylindrical inner pellet forms 10 to 50 volume percent of the entire nuclear fuel pellet. These and other aspects of the present invention will become more clear upon review of the detailed description of the invention in conjunction with the drawing briefly described below.

DETAILED DESCRIPTION OF THE INVENTION

Figure 1:
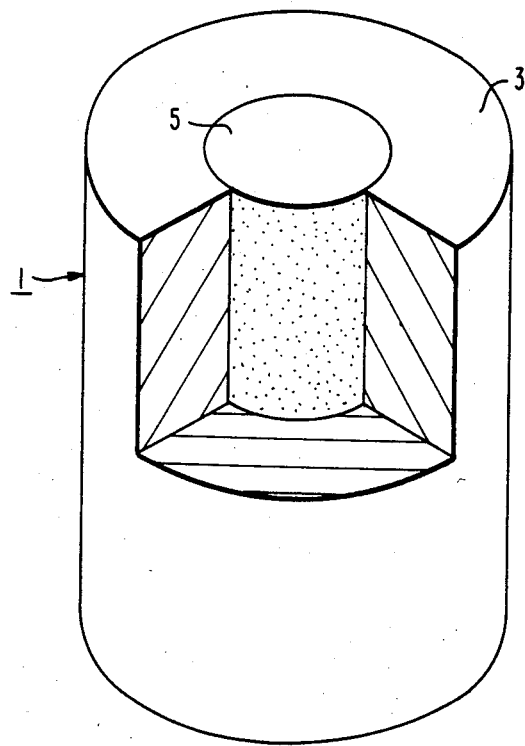
FIG. 1 shows an elevational view of one embodiment of a nuclear fuel pellet in accordance with the present invention.

As shown in FIG. 1 in accordance with my invention a nuclear fuel pellet 1 is provided having an annular outer pellet 3 and an inner pellet 5 located concentrically within the annular outer pellet. The outer pellet 3 and the inner pellet 5 are preferably separately made by conventional fuel pellet manufacturing techniques. The annular outer pellet 3 contains essentially only enriched $UO_2$ without gadolinia. Preferably the outer pellet three has an enrichment between about 2 to 5 w/o U-235. The inner cylindrical pellet 5 contains both gadolinia and $UO_2$. The gadolinia content is limited to about 4 to about 18 w/o and more preferably 10 to 16 w/o. The $UO_2$ of the inner pellet contains only natural, depleted or a mixture of natural and depleted uranium and is preferably entirely natural uranium. The inner pellet 5 forms 10 to 50 v/o, and preferably 20 to 30 v/o of the nuclear fuel pellet 1.

A typical application of the present invention would be to form a mixture of 16 w/o gadolinia with natural $UO_2$. This would then be fabricated into gadolinia-$UO_2$ cylindrical pellets 5 forming about 25 v/o of the fuel pellet 1. The outer annular portion 3 of the fuel pellet would be separately fabricated entirely of $UO_2$ enriched to about 4 w/o U-235.

The use of an inner pellet 5 consisting essentially of only gadolinia (at the concentrations specified) and nonenriched uranium offer significant advantages over the prior art designs. These advantages are as follows:

(1) There will be fewer uranium enrichments to fabricate. Currently the $UO_2$ enrichment of a gadolinia poisoned pellet is reduced 4% or more for every w/o of gadolinium. Thus, in an assembly where unpoisoned rods are 4 w/o enriched $UO_2$, 3 w/o gadolinia poisoned rods would contain 3.4 w/o enriched $UO_2$. As a result a relatively small batch of lower enrichment $UO_2$ has to be processed. In accordance with the present invention, the outside annular pellet 3 would remain at 4 w/o enriched $UO_2$. All the gadolinia poisoned pellets 5 would contain only natural uranium and these poisoned pellets 5 could be made up ahead of time. The decrease in enrichment would then occur automatically when the poisoned cylindrical pellet 5 is placed inside of the 4 w/0 enriched $UO_2$ outer annular layer 3.

(2) The nuclear fuel pellet 1 will have a flatter local peaking factor versus burnup behavior. When the gadolinia burns out, it is uncovering natural $UO_2$ instead of enriched $UO_2$. Therefore, the power of the poisoned fuel rods will increase less with burnup. The assembly power shape will then be easier to optimize as it will be more constant with burnup.

(3) The temperature profile of the pellet will be improved (i.e. temperatures in the center of the pellet are reduced). As previously mentioned it is known that gadolinia poisoned pellets have lower thermal conductivity and melting points compared to nonpoisoned pellets. Mixing the gadolinia with natural $UO_2$ will reduce the power produced in the poisoned part 5 of the pellet 1 by a factor of more than five in a typical case. This reduction occurs due to three effects: (i) There are roughly a fifth as many U-235 atoms in the poisoned part of the pellet; (ii) the poisoned part of the pellet is on the inside of the enriched portion 3 of the pellet 1 and is, therefore, shielded by the outside portion of the pellet; and (iii) The average enrichment of the poisoned pellet is less than the assembly average enrichment.

(4) There is a fuel cycle cost benefit due to the increased self shielding of the gadolinium even isotopes. This reduces the gadolinium even isotope penalty (parasitic neutron absorption) after the odd isotopes have burned out. This self shielding is due to the concentrating of the gadolinia in the inner portion 5 of the pellet. The reduced temperature in the inner portion of the pellet (due to the natural urania) decreases the doppler broadening of the resonances of the gadolinia even isotopes. This further increases the self shielding and further decreases the fuel cycle cost penalty of the gadolinium even isotopes.

(5) The facility which makes the gadolinia poisoned pellets 5 can be base loaded. The value of a natural $UO_2$ pellet is much lower than a comparable enriched pellet. Therefore, these natural $UO_2$-gadolinia pellets 5 can be stockpiled.

Figure 2:
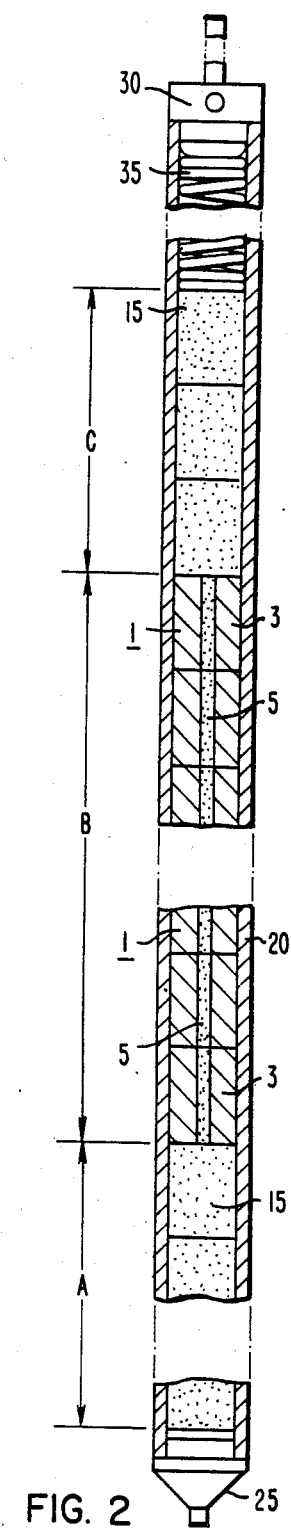
FIG. 2 shows a partial cross-section through an embodiment of a light water reactor fuel element in accordance with the present invention.

The foregoing fuel pellets in accordance with the present invention may be preferably utilized in a nuclear fuel element 10 also in accordance with the present invention as shown in FIG. 2. The fuel element 10 contains nuclear fuel pellets 1 and 15 within an elongated hermetically sealed chamber filled with appropriately pressurized high purity helium. The chamber is formed by elongated tubular cladding 20 having end caps 25 and 30 welded to each of its ends. Preferably the fuel cladding and end caps are composed of a zirconium base alloy, such as Zircaloy-2, Zircloy-4. Nuclear fuel pellets 1 and 15, having an outside diameter slightly smaller than the inside diameter of the cladding 20, are stacked one upon the other forming a column of about 144 inches in length for example, within the elongated chamber. The column of fuel pellets are held against the bottom end cap 25 by a resilient means, such as a spring 35, compressively held between the top end cap 30 and the top of the fuel pellet column.

Preferably the nuclear fuel pellets are segregated into at least three zones A, B, and C. The top zone, C, and the bottom zone, A, contain solid cylindrical fuel pellets 15 having a substantially homogeneous composition throughout and consisting essentially of enriched $UO_2$ without a burnable absorber. Optionally zone A and/or C may also include solid cylindrical pellets consisting of $UO_2$ containing entirely natural uranium, depleted uranium or a mixture of the two. When present these nonenriched pellets are preferably segregated in zones up to 12 inches in length at the extreme upper and lower ends of the fuel columns. Typically, these nonenriched zones are about 6 inches in length. The enriched pellets in zones A and C contain uranium having an enrichment level between about 2 to 5 w/o U-235, and each enriched zone has a length of up to 24 inches, but are more typically about 9 inches in length.

The fuel pellets 1 in the center zone, B, of the fuel pellet column are in accordance with the poisoned fuel pellets described in FIG. 1. They have an outer annular pellet 3 of nonpoisoned enriched $UO_2$ and a cylindrical inner pellet 5 composed of gadolinia and nonenriched $UO_2$ as previously described.

As noted before the design of the poisoned fuel pellets 1 in accordance with my invention allows the enrichment level in the outer annular layer 3 of pellets 1 to be the same as that found in the enriched pellets of zones A and C. In a preferred embodiment of my invention the enrichment level in all the enriched pellets 15 in zones A and C, and the enrichment level in all the annular pellets 3 are identical.

The preceding description has clearly demonstrated the benefits obtainable through the practice of the present invention. Other embodiments of the invention will become more apparent to those skilled in the art from a consideration of the specification or actual practice of the invention disclosed herein. It is intended that the specification and examples be considered as exemplary only, with the true scope and spirit of the invention being indicated by the following claims.

I claim:

1. A nuclear fuel pellet comprising:
   an annular outer pellet;
   a cylindrical inner pellet;
   said cylindrical inner pellet located inside of said outer pellet;
   said annular outer pellet consisting essentially of $UO_2$ enriched in U-235;
   said cylindrical inner pellet consisting essentially of about 4 to about 18 w/o $Gd_2O_3$ with the remainder consisting essentially of $UO_2$ containing uranium selected only from the group consisting of natural uranium, depleted uranium and their mixtures with each other;
   and said cylindrical inner pellet forming between 10 and 50 w/o of said nuclear fuel pellet.

2. The nuclear fuel pellet according to claim 1 wherein said cylindrical inner pellet contains about 10 to 16 w/o $Gd_2O_3$.

3. The nuclear fuel pellet according to claim 1 wherein the uranium in said cylindrical inner pellet is entirely natural uranium.

4. The nuclear fuel pellet according to claim 2 wherein the uranium in said cylindrical inner pellet is entirely natural uranium.

5. The nuclear fuel pellet according to claim 1 wherein said cylindrical inner pellet forms about 20 to about 30 v/o of said nuclear fuel pellet.

6. The nuclear fuel pellet according to claim 2 wherein said cylindrical inner pellet forms about 20 to about 30 v/o of said nuclear fuel pellet.

7. The nuclear fuel pellet according to claim 3 wherein said cylindrical inner pellet forms about 20 to about 30 v/o of said fuel pellet.

8. The nuclear fuel pellet according to claim 4 wherein said cylindrical inner pellet forms about 20 to about 30 v/o of said fuel pellet.

9. A nuclear fuel element comprising:
   a hermetically sealed tubular structure forming an elongated chamber;
   a column of nuclear fuel pellets stacked one upon the other within said elongated chamber;
   said nuclear fuel pellets including solid cylindrical pellets consisting essentially of $UO_2$ enriched to an enrichment level between about 2 to 5 w/o U-235, annular pellets consisting essentially of $UO_2$ enriched to an enrichment level between about 2 to 5 w/o U-235, small diameter cylindrical pellets located within said annular pellets, and said small diameter cylindrical pellets consisting essentially of about 4 to about 18 w/o $Gd_2O_3$ with the remainder consisting essentially of $UO_2$ uranium selected only from the group consisting of natural uranium, depleted uranium, and their mixtures with each other; and wherein the level of enrichment of all said solid cylindrical pellets and the level of enrichment of all said annular pellets is the same.

10. The nuclear fuel element according to claim 9 further wherein said nuclear fuel pellets further include nonenriched $UO_2$ pellets consisting essentially of $UO_2$ in which the uranium is selected from the group consisting of natural uranium, depleted uranium and their mixtures with each other.

* * * * *